(12) United States Patent
Ohnishi et al.

(10) Patent No.: US 12,111,966 B2
(45) Date of Patent: Oct. 8, 2024

(54) POSITION/FORCE CONTROL SYSTEM, WORN UNIT, CONTROL UNIT, POSITION/FORCE CONTROL METHOD, AND STORAGE MEDIUM

(71) Applicants: KEIO UNIVERSITY, Tokyo (JP); Motion Lib, Inc., Kawasaki (JP)

(72) Inventors: Kouhei Ohnishi, Kanagawa (JP); Takahiro Mizoguchi, Kanagawa (JP)

(73) Assignees: KEIO UNIVERSITY, Tokyo (JP); MOTION LIB, INC., Kanagawa (JP)

( * ) Notice: Subject to any disclaimer, the term of this patent is extended or adjusted under 35 U.S.C. 154(b) by 0 days.

(21) Appl. No.: 17/802,933

(22) PCT Filed: Feb. 27, 2021

(86) PCT No.: PCT/JP2021/007588
§ 371 (c)(1),
(2) Date: Aug. 26, 2022

(87) PCT Pub. No.: WO2021/172580
PCT Pub. Date: Sep. 2, 2021

(65) Prior Publication Data
US 2023/0134614 A1   May 4, 2023

(30) Foreign Application Priority Data
Feb. 27, 2020   (JP) .................... 2020-032447

(51) Int. Cl.
*G06F 3/01* (2006.01)
(52) U.S. Cl.
CPC .............. *G06F 3/016* (2013.01); *G06F 3/011* (2013.01)

(58) Field of Classification Search
CPC . G06F 3/011; G06F 3/016; B25J 13/00; B25J 13/02
See application file for complete search history.

(56) References Cited

U.S. PATENT DOCUMENTS

| | | |
|---|---|---|
| 2003/0135203 A1 | 7/2003 | Wang et al. |
| 2007/0112466 A1 | 5/2007 | Ohnishi et al. |

(Continued)

FOREIGN PATENT DOCUMENTS

| | | |
|---|---|---|
| JP | H06209902 A | 8/1994 |
| JP | H08145007 A | 6/1996 |

(Continued)

OTHER PUBLICATIONS

International Search Report (ISR) (and English language translation thereof) dated May 11, 2021, issued in International Application No. PCT/JP2021/007588.

(Continued)

*Primary Examiner* — Yaron Cohen
(74) *Attorney, Agent, or Firm* — Holtz, Holtz & Volek PC

(57) ABSTRACT

A position/force control system includes a worn unit and a control unit. The worn unit is configured to be worn on a body of a user, and provides force tactile sensation by an actuator. The control unit acquires data of a position of the worn unit in a space, based on data of space in which a touching object exists. The worn unit includes a control unit that acquires the data of the position from the control unit and controls driving of the actuator based on impedance and contour information of the touching object in the space, and the data of the position, thereby providing force tactile sensation.

10 Claims, 11 Drawing Sheets

(56) References Cited

U.S. PATENT DOCUMENTS

| | | |
|---|---|---|
| 2009/0110533 A1 | 4/2009 | Jinno |
| 2010/0245237 A1 | 9/2010 | Nakamura |
| 2015/0137727 A1 | 5/2015 | Furutani et al. |
| 2016/0103489 A1* | 4/2016 | Cruz-Hernandez ..... G06F 1/163 345/161 |
| 2016/0207196 A1 | 7/2016 | Ohnishi et al. |
| 2017/0212589 A1* | 7/2017 | Domenikos ........... G06F 3/0346 |
| 2018/0350086 A1 | 12/2018 | Sweet et al. |
| 2019/0143510 A1 | 5/2019 | Ohnishi et al. |
| 2020/0376681 A1 | 12/2020 | Ohnishi et al. |
| 2021/0107134 A1 | 4/2021 | Shimono et al. |
| 2021/0282795 A1 | 9/2021 | Shimono et al. |
| 2021/0334336 A1 | 10/2021 | Ohnishi et al. |
| 2022/0134542 A1 | 5/2022 | Ohnishi et al. |
| 2022/0276711 A1 | 9/2022 | Ohnishi et al. |

FOREIGN PATENT DOCUMENTS

| | | |
|---|---|---|
| JP | 2000047567 A | 2/2000 |
| JP | 2001067113 A | 3/2001 |
| JP | 2001166676 A | 6/2001 |
| JP | 2002287613 A | 10/2002 |
| JP | 2002312003 A | 10/2002 |
| JP | 2004318400 A | 11/2004 |
| JP | 2005515012 A | 5/2005 |
| JP | 2007274783 A | 10/2007 |
| JP | 2009107095 A | 5/2009 |
| JP | 2009279699 A | 12/2009 |
| JP | 2011152333 A | 8/2011 |
| JP | 2014215563 A | 11/2014 |
| JP | 2017168121 A | 9/2017 |
| JP | 2019030960 A | 2/2019 |
| WO | 2005109139 A1 | 11/2005 |
| WO | 2013108356 A1 | 7/2013 |
| WO | 2015041046 A1 | 3/2015 |
| WO | 2019117309 A1 | 6/2019 |
| WO | 2021025087 A1 | 2/2021 |

OTHER PUBLICATIONS

Written Opinion dated May 11, 2021, issued in International Application No. PCT/JP2021/007588.

* cited by examiner

POSITION/FORCE CONTROL SYSTEM, WORN UNIT, CONTROL UNIT, POSITION/FORCE CONTROL METHOD, AND STORAGE MEDIUM

TECHNICAL FIELD

The present invention relates to a position/force control system, a worn unit, a control unit, a position/force control method, and a storage medium, that provides a user with position and force.

BACKGROUND ART

In recent years, there is known a device that provides the body of a user with force tactile sensation when touching an object.

For example, exoskeletal devices and so forth, which are worn on the fingers of users and convey sense of touch when touching an object by conveying force tactile sensation to the fingers of the user using actuators, are commercially available.

Using such devices enables users to be provided with the sense of touch of objects and so forth in a virtual space such as in a network game or the like.

A device that provides the body of a user with force tactile sensation is described in PTL 1, for example.

CITATION LIST

[Patent Literature]
 [PTL 1]: Japanese Unexamined Patent Application Publication No. 2001-166676

SUMMARY OF INVENTION

Technical Problem

However, with the conventional technology in which force tactile sensation is provided to the body of the user, control of the device worn on the body of the user (exoskeletal worn unit or the like) is performed by a PC (Personal Computer) or a server or the like.

Accordingly, delay of control signals to the device worn on the body of the user may become great, and appropriate control may not be able to be performed.

Solution to Problem

A position/force control system according to an aspect of the present invention includes: a worn unit that is configured to be worn on a body of a user, and provides force tactile sensation by an actuator; and a control unit that, based on data of a space in which a touching object exists, acquires data of a position of the worn unit in the space, wherein the worn unit includes a controller that acquires the data of the position from the control unit, and controls driving of the actuator based on impedance and contour information of the touching object in the space, and the data of the position, thereby providing force tactile sensation.

Advantageous Effects of Invention

According to the present invention, control of providing force tactile sensation can be realized by a more appropriate system configuration.

DESCRIPTION OF EMBODIMENTS

Figure 1:
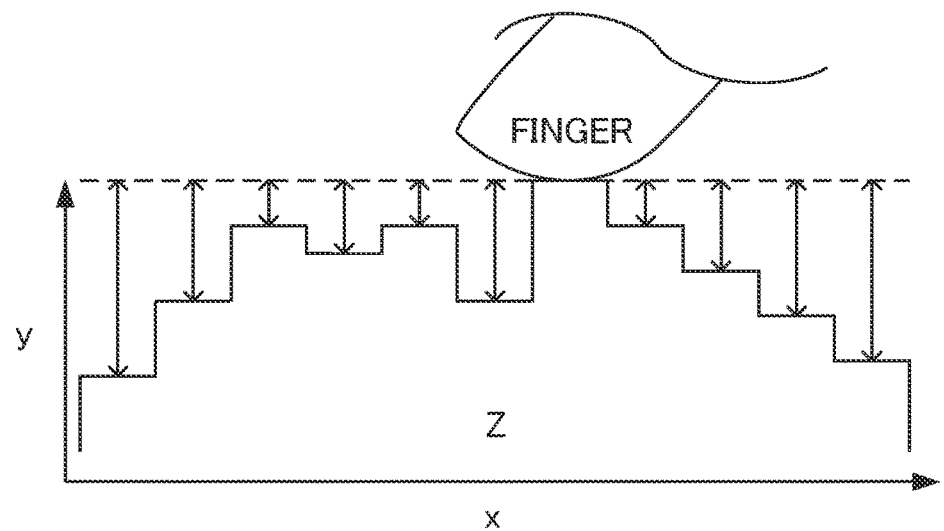
FIG. 1 schematically illustrates the concept or the sense of touch of the object according to the present invention.

An embodiment of the present invention will be described below with reference to the drawings.

First, a basic principle applied to the present invention will be described.

[Basic Principle]

In the present invention, in a case of touching an object, force tactile sensation is handled as information, including texture that represents sense of touch of the object surface, and provided to the user by a device.

At this time, force tactile sensation is handled as information in a case of touching an object, by using stiffness, viscosity, and inertia (impedance of the object) of the touching object.

Also, a position/force control system according to the present invention includes a control unit made up of an information processing device such as a PC or the like, and a worn unit that is worn in the body of the user. Regarding position in space in which the touching object exists (virtual space or remote space, etc.), the control unit acquires information (position of the worn unit in the virtual space or the remote space, etc.). Also, the worn unit is made up of a device worn on the body of the user (exoskeletal robot, etc.), and conveys force tactile sensation to the user by driving actuators that virtually create reaction from the object.

In such a configuration, the control unit acquires (calculates) information relating to the position of the worn unit in the space in which the touching object exists (hereinafter referred to as "in-space position information"), and successively transmits the in-space position information that is acquired to the worn unit without calculating information representing force tactile sensation output at the worn unit (position and force output by the actuator, etc.). The worn unit stores physical parameters corresponding to the position of the space in which the touching object exists (the impedance and contour information of the object here). The worn unit then calculates information representing the force tactile sensation from the touching object, including texture, using physical parameters of the object that is the touching object, based on the in-space position information transmitted from the control unit and information relating to the position of an output shaft (or a member that operates in accordance with the output shaft) of the actuator (hereinafter referred to as "output position information"), and controls the actuator to provide the user with force tactile sensation.

By employing a configuration such as described above, the data amount transmitted from the control unit to the worn unit can be reduced as compared to a case where the control unit calculates and transmits information relating to the force tactile sensation output at the worn unit, and accordingly delay in control signals can be suppressed from becoming great.

Accordingly, control of providing force tactile sensation can be realized by a more appropriate system configuration.

Next, a method for handling force tactile sensation as information in a case of touching an object, according to the present invention, will be described.

[Acquisition of Impedance of Object]

In the present invention, impedance of the object to be touched is used in order to handle force tactile sensation as information in a case of touching an object. The impedance of the object is represented by the stiffness, the viscosity, and the inertia of the touching object, and accordingly, in a case where the stiffness, the viscosity, and the inertia of the touching object are known, these values can be acquired and used for control. Also, in a case where the stiffness, the viscosity, and the inertia of the touching object are not known, values of the stiffness, the viscosity, and the inertia estimated by actually touching the touching object (impedance of the object) can be used for control.

When the impedance of the object is estimated, coordinate conversion or a parameter in real space into that in a coordinate system in which a position and force can be independently used is carried out to perform a computation regarding the force tactile sensation when the object is touched. The coordinate conversion is defined as conversion that represents a function of controlling the force tactile sensation, and one disclosed in international Publication No. 2015/041046 as coordinate conversion that represents a function of transmitting the force tactile sensation, for example, can be used. The concept of the function of controlling the force tactile sensation includes controlling the force tactile sensation that humans can feel and controlling, for example, a position, velocity, or force that is outputted by a machine.

Coordinate conversion of an input vector that represents a position and force in the real space into a vector in the coordinate system described above is carried out based on the output position information of an actuator. In the coordinate system, a computation for causing a state value (a vector element) that is acquired by the coordinate conversion to follow a target value for fulfilling the function of controlling the force tactile sensation is performed.

Further, the function of controlling force tactile sensation is realized by performing reverse conversion of computation results in the above coordinate system into u real space parameter, and controlling the actuator based on this parameter. Also, the impedance (the stiffness, the viscosity, and the inertia) of the object to be touched is estimated based on the parameter acquired through this series of control.

Note that in such a case of estimating impedance of the object to be touched, devices or the like can be used, such as those having a form including an actuator at the side touching the object to be touched and an actuator at the side conveying the force tactile sensation to a user, such as in a master/slave system, or a form including one actuator that takes a predetermined reference value (a reference value representing a predetermined touching force or the like) as input.

[Providing Sense of Touch of Object Surface]

The sense of touch (specifically, the force tactile sensation including the texture that represents the sense of touch of the object surface) of the object surface in the real space or virtual space can be provided by using the impedance estimated as above.

According to the present invention, the stiffness, the viscosity, and the inertia (the impedance) of the touching object are regarded as being inherent, and reaction force from the object is defined as a function depending on a position in a direction perpendicular to a plane and a position in a direction of the plane on the object surface in order to provide the sense of touch of the object surface. Consequently, the texture that represents the sense of touch of the object surface is informatized.

Specifically, the sense of touch of the touching object is defined based on an equation of motion that is expressed as a function in which the stiffness, the viscosity, and the inertia are constants, and a position that determines an action on and a reaction from the object includes, as elements, the position in the direction perpendicular to the plane and the position in the direction of the plane on the object surface.

In the case where the position in the direction perpendicular to the plane and the position in the direction of the plane on the object surface are given as an input in the real space or the virtual space, a valise that is determined by a function that defines the sense of touch of the touching object is inputted as a reference value, the computation for following the target value is performed in the coordinate system described above, and the output of the actuator is controlled. Consequently, the force tactile sensation including the texture that represents the sense of touch of the object surface can be provided.

A position and velocity (or acceleration) or an angle and angular velocity (or angular acceleration) are parameters that can be replaced by calculus. Accordingly, in the case where processing regarding the position or the angle is performed, these can be appropriately replaced with, for example, the velocity or the angular velocity.

[Function Representing Sense of Touch of Object]

According to the present invention, the stiffness, the viscosity, and the inertia (the impedance) of the touching object are regarded as being inherent, and the sense of touch of the or is defined as the function depending on the position in the direction perpendicular to the plane and the position in the direction of the plane on the object surface. Consequently, the texture that represents the sense of touch of the object surface is informatized as described above.

The sense of touch (the force tactile sensation including the texture that represents the sense of touch of the object surface) of the object is affected by not only the shape of the object surface but also physical characteristics of the object itself. Accordingly, in the case where the sense of touch of the object is defined, it is effective to reflect the impedance of the object.

FIG. 1 schematically illustrates the concept of the sense of touch of the object according to the present invention.

As illustrated in FIG. 1, in the case where the shape of the object surface to be touched is not a smooth surface but has fine unevenness, it is thought that the impedance (the stiffness, the viscosity, and the inertia) of the object itself does not change, and the shape (the contour) of the surface changes.

In this case, it can be said that an appropriate way of thinking about a phenomenon is to think that a parameter Z that represents the impedance of the object does not change, and the reaction force from the object changes depending on a touch position (the position y in the direction perpendicular to the plane and the position x in the direction of the plane on the object surface).

In view of this, according to the present invention, the sense of touch or the object is defined by using the stiffness, the viscosity, and the inertia inherent in the object and information about the contour of the object surface.

Specifically, the sense of touch of the object is defined as the following expressions (1) and (2).

[Math. 1]

$$f = m\ddot{x} + d\dot{x} + kx \quad (1)$$

$$x = g(y, t) \quad (2)$$

In the expressions (1) and (2), f is the reaction force from the touching object, m is the inertia, d is the viscosity, k is the stiffness, g is a function that represents the contour of the object surface, and t is time. The function that represents the contour of the object surface is a function of the time t. Accordingly, the expression (2) represents the contour of the object surface the shape of which changes depending on, for example, a touch.

In this case, parameters to be managed to acquire or provide the sense of touch are the stiffness, the viscosity, and the inertia (the impedance) inherent in the object, and the position in the direction perpendicular to the plane and the position in the direction of the plane on the object surface, and the sense of touch can be acquired or provided by using a decreased number of the parameters.

In the case where it is thought that the stiffness, the viscosity, and the inertia change (that is, the impedance changes depending on the touch position) at the touch position on the object to be touched, it is thought that the stiffness, the viscosity, and the inertia of the touching object are represented by the function depending on the position in the direction of the plane on the object surface touched.

Figure 2:
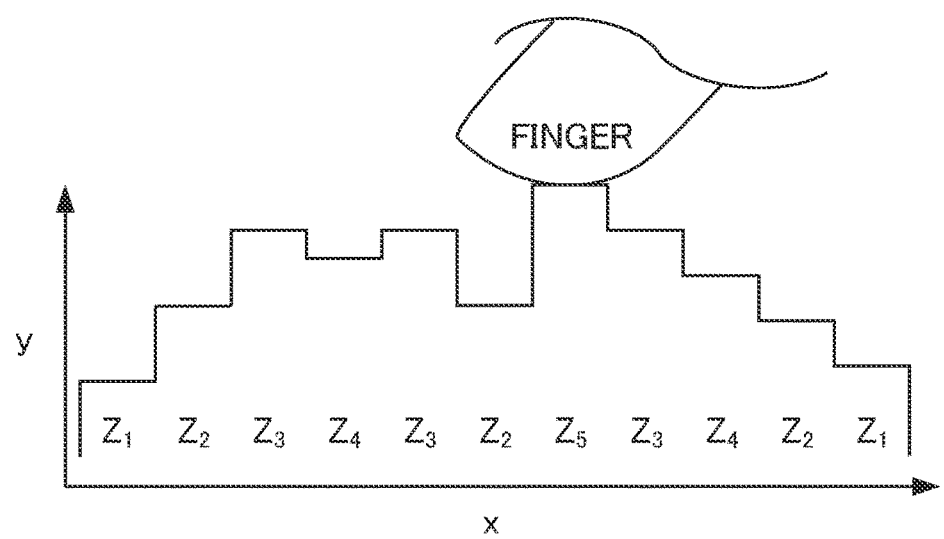
FIG. 2 schematically illustrates the concept of the sense of touch of the object in the case where it is thought that the stiffness, the viscosity, and the inertia change at the touch position on the object to be touched.

FIG. 2 schematically illustrates the concept of the sense of touch of the object in the case where it is thought that the stiffness, the viscosity, and the inertia change at the touch position on the object to be touched.

In the concept illustrated in FIG. 2, it is thought that impedance $Z_1$ to $Z_5$ changes depending on the position x in the direction of the plane on the object surface touched. Accordingly, the sense of touch of the object is expressed as the following expression (3).

[Math. 2]

$$f = m(x)\ddot{x} + d(x)\dot{x} + k(x)x \quad (3)$$

In this case, the data of the stiffness, the viscosity, and the inertia is needed at every position. Accordingly, the number of the parameters to be managed is larger than that in the case where the sense of touch of the object is defined as the expressions (1) and (2), there is a possibility that implementation costs increase, and the amount of computation increases.

According to the present invention, the sense of touch of the object is defined as the expressions (1) and (2) accordingly, and the texture including the sense of touch of the object surface is dealt with.

Note that employing the system configuration according to the present invention is effective to a certain extent even in a case of expressing the sense of touch of the object in accordance with expression (3), and dealing with impedance $Z_1$ to $Z_5$ as changing depending on the position x in the direction of the plane on the object surface that is touched. That is to say, in a case where the sense of touch of the object is defined as in expression (3), the computation amount at the worn unit increases as compared to the case or defining the sense of touch of the object as in expressions (1) and (2), however, force tactile sensation including texture representing the sense of touch of the object surface can be provided by transmitting information relating to the position from the control unit to the worn unit, and accordingly the delay of control signals can be suppressed from becoming great.

[Configuration]

Next, the system configuration of the present invention will be described.

Figure 3:
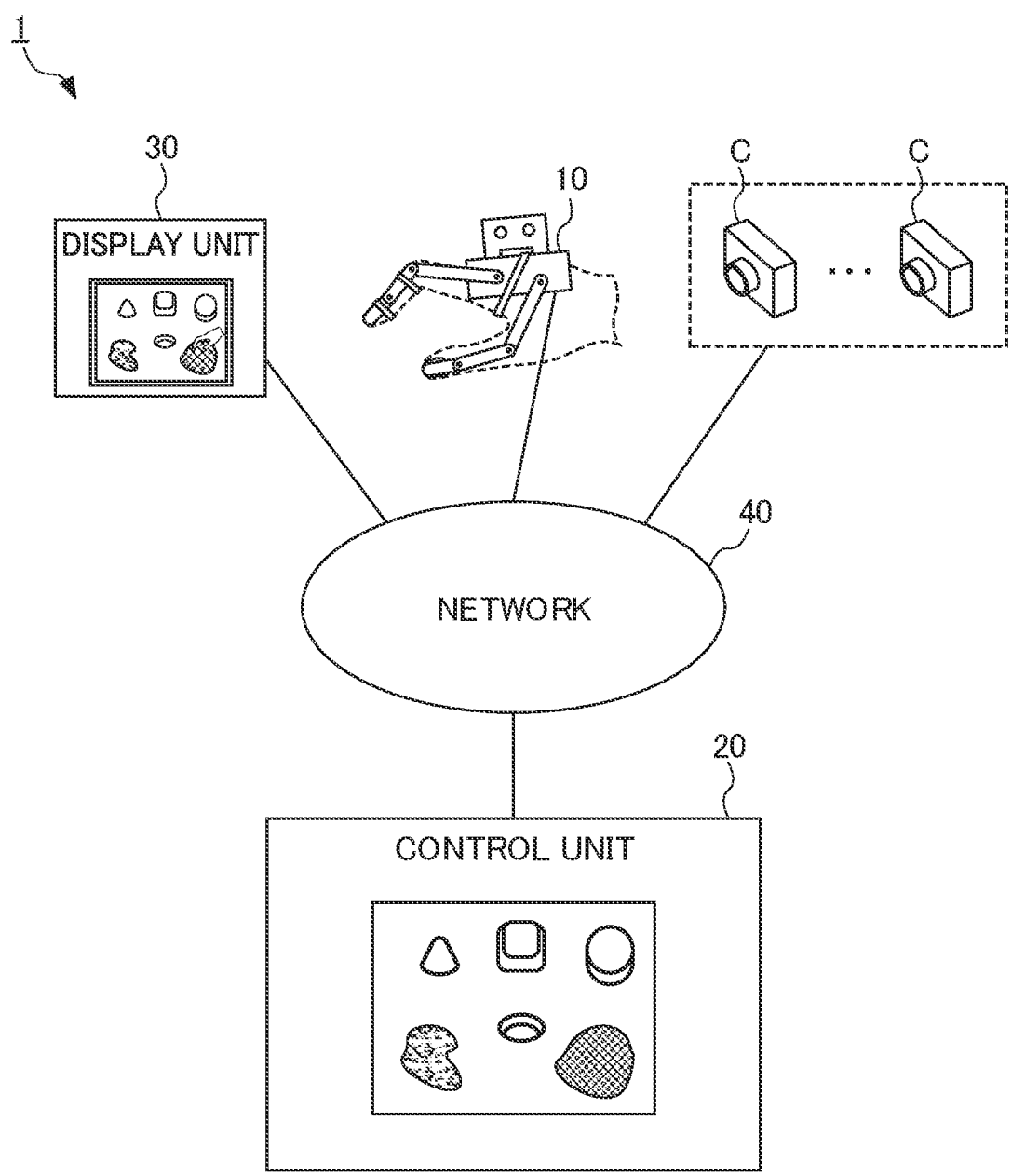
FIG. 3 schematically illustrates an overall configuration of a position/force control system 1 according to an embodiment of the present invention.

FIG. 3 schematically illustrates an overall configuration of a position; force control system 1 according to an embodiment of the present invention.

As illustrated in FIG. 3, the position/force control system 1 according to the present embodiment is configured including a worn unit 10 that is worn by a user (a hand of the user here) and provides force tactile sensation to the user, a control unit 20 that performs control of the worn unit 10, a display unit 30 that provides the user with visual information, and a plurality of imaging devices C that detect position and attitude of the worn unit 10.

The worn unit 10, the control unit 20, the display unit 30, and the plurality of imaging devices C are configured to be communicable via a network 40. The network 40 includes a wired or a wireless communication pathway, and realizes communication among the worn unit 10, the control unit 20, the display unit 30, and the plurality of imaging devices C by a communication form such as a public network like the Internet or the like, direct connection by a dedicated line or communication cable, and so forth.

The worn unit 10 is configured as an exoskeletal device including a plurality of joints corresponding to human fingers, for example, and controls driving of actuators that rotate the joints based on the in-space position information transmitted from the control unit 20. Note that a position (reference position), corresponding to a particular portion (for example, the middle portion of the wrist, or the like) serving as a reference set with respect to the worn unit 10 in the space in which the touching object exists, can be used as the in-space position information. In this case, the relative position from the reference position to each finger is calculated in the worn unit 10. Note however, that a position corresponding to each finger (individual position) in the space in which the touching object exists can also be used as the in-space position information.

Also, the worn unit 10 stores parameters representing the physical characteristics of the touching object in the space (virtual space or remote space, etc.) in which the touching object exists. The parameters representing the physical characteristics of the touching object may be, for example, stiffness, viscosity, and inertia (impedance of the object) of the touching object.

The sense of touch (the force tactile sensation including texture, representing the sense of touch of the object surface) of the object is affected by not only the shape of the object surface but also the physical characteristics of the object itself. Accordingly, in a case where the sense of touch of the object is to be defined, reflecting the impedance of the object is effective.

Force tactile sensation including the sense of touch of the object can be provided by controlling driving of each of the actuators (position and force of each of the joints) based on in-space position information in the space (virtual space or remote space, etc.) in which the touching object exists, physical parameters (impedance and contour information of the object), and output position information of the actuators.

In the embodiment, physical parameters corresponding to the position in the space in which the touching object exists are transmitted from the control unit 20 to the worn unit 10 in advance, and when executing control of providing force tactile sensation, just the in-space position information in the space in which the touching object exists is successively transmitted to the worn unit 10. Parameters for providing force tactile sensation including the sense of touch of the object (parameters for controlling driving of the actuators) are then calculated at the worn unit 10 based on the in-space position information, the physical parameters (impedance and contour information of the object), and the output position information of the actuators.

Accordingly, delay in control signals can be suppressed from occurring as compared to a case where the control unit 20 calculates parameters for providing force tactile sensation including sense of touch of the object (parameters for controlling driving of the actuators) and transmits the parameters from the control unit 20 to the worn unit 10. That is to say, control of providing force tactile sensation can be realized by a more appropriate system configuration.

Also, in the present embodiment, images taken of the worn unit 10 from a plurality of directions by the plurality of imaging devices C are successively transmitted to the control unit 20. Thereupon, the position and the attitude of the worn unit 10 are detected at the control unit 20 based on the images of the worn unit 10 taken by the plurality of imaging devices C.

Accordingly, in a case where the touching object is a thin material, such as a sheet-like material or the like, for example, control can be performed while distinguishing, which of the front and rear sides is being touched.

Thus, the weight of the material can be reflected in the force tactile sensation and so forth, and the force tactile sensation including the sense of touch of the object can be provided more appropriately.

Note that the position and the attitude of the worn unit 10 can also be acquired by various types of devices, such as a three-dimensional laser scanner or the like, for example, besides acquiring by the plurality of imaging devices C.

The control unit 20 is made up of an information processing, device such as, for example, a PC or a server computer or the like. The control unit 20 generates data of the space (virtual space or remote space, etc.) in which the touching object exists, by performing three-dimensional modeling. For example, the control unit 20 generates images of virtual real space obtained by three-dimensional modeling based on the data of the taken images, generates images of virtual real space obtained by three-dimensional modeling based on data of three-dimensional computer graphics, and so forth. Also, the control unit 20 detects the position and the attitude of the worn unit 10 based on the images of the worn unit 10 taken by the plurality of imaging devices C. The control unit 20 then acquires (calculates) the in-space position information of the worn unit 10 in the space (virtual space or remote space, etc.) in which the touching object exists, based on the position and the attitude of the worn unit 10 that is detected, and successively transmits the in-space position information that is acquired to the worn unit 10, without calculating information representing the force tactile sensation outputted at the worn unit 10 (position and force outputted by the actuators, etc.).

Also, the control unit 20 transmits physical parameters of the touching object in the space in which the touching object exists, to the worn unit 10. In the present embodiment, in a case where the position of the worn unit 10 represented by in-space position information in the space in which the touching object exists reaches (or immediately prior to reaching) a position (boundary of touching object) of a touching object having different physical parameters, the control unit 20 transmits physical parameters of the new touching object. Note however, that physical parameters of each touching object in the space in which the touching object exists may be transmitted together from the control unit 20 to the worn unit 10 in advance.

Further, the control unit 20 generates image data for displaying the space in which the touching object exists, and also generates virtual images of the worn unit 10 in the space in which the touching object exists. The control unit 20 then successively transmits the image data for displaying the space in which the touching object exists, and the virtual image data of the worn unit 10, which are generated, to the display unit 30.

The display unit 30 is made up of an information processing device such as a PC having a display or the like, for example, and displays images of the space in which the touching object exists, and virtual images of the worn unit 10 in this space, in accordance with the image data transmitted from the control unit 20. Note that the display unit 30 may be made up of various types of image displaying devices, such as a head-mounted display, a stationary display, or a projector or the like.

In the position/force control system 1 having the configuration described above, the control unit 20 that generates data of the space in which the touching object exists, and the worn unit 10 that provides virtual force tactile sensation in the space in which the touching object exists, are located on opposite sides across the network 40 in network topology.

Figure 4:
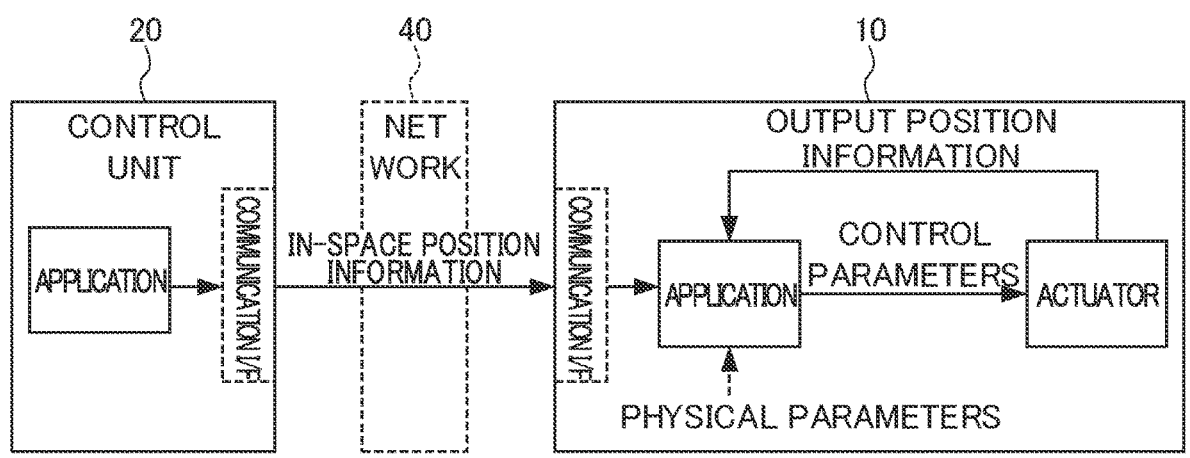
FIG. 4 schematically illustrates the network topology of the position/force control system 1.

FIG. 4 schematically illustrates the network topology of the position/force control system 1.

As illustrated in FIG. 4, in the position/force control system 1, data (in-space position information) serving as a trigger for control to provide force tactile sensation is transmitted from the control unit 20 to the worn unit 10 via the network 40 and communication interfaces (communication I/Fs). Also, parameters for providing sense of touch of the object (parameters for controlling driving of the actuators) are calculated at the worn unit 10 based on the in-space position information received from the control unit 20, and the actuators are driven.

Note that the network 40 and the communication I/Fs in FIG. 4 make up the network layer/data link layer/physical layer in the OSI model, for example, and make up the Internet layer/network interface layer in the TCP/IP protocol. In the present embodiment, control for providing force tactile sensation is executed at the application layer in either of the OSI model or the TCP/IP protocol.

That is to say, at the application layer of the control unit 20, after acquiring in-space position information, only processing successively transmitting the in-space position information is executed, without executing processing for control of the worn unit 10. On the other hand, at the application layer of the worn unit 10, parameters for controlling driving of the actuators (control parameters) are successively calculated based on the in-space positon information received from the control unit 20, the physical parameters (impedance and contour information of the object) that the worn unit 10 stores, and output position information of the actuators. Thereafter, successively outputting the control parameters that are calculated from the application layer of the worn unit 10 to the actuators realizes providing of force tactile sensation including the sense of touch of the object.

Accordingly, exchange of data via the network 40 and the communication interfaces (communication I/Fs) does not occur in an actuator control loop at the worn unit 10, and thus delay control signals can be suppressed from occurring.

Next, a specific configuration of the worn unit 10 and the control unit 20 in the position/force control system 1 will be described.

Figure 5:
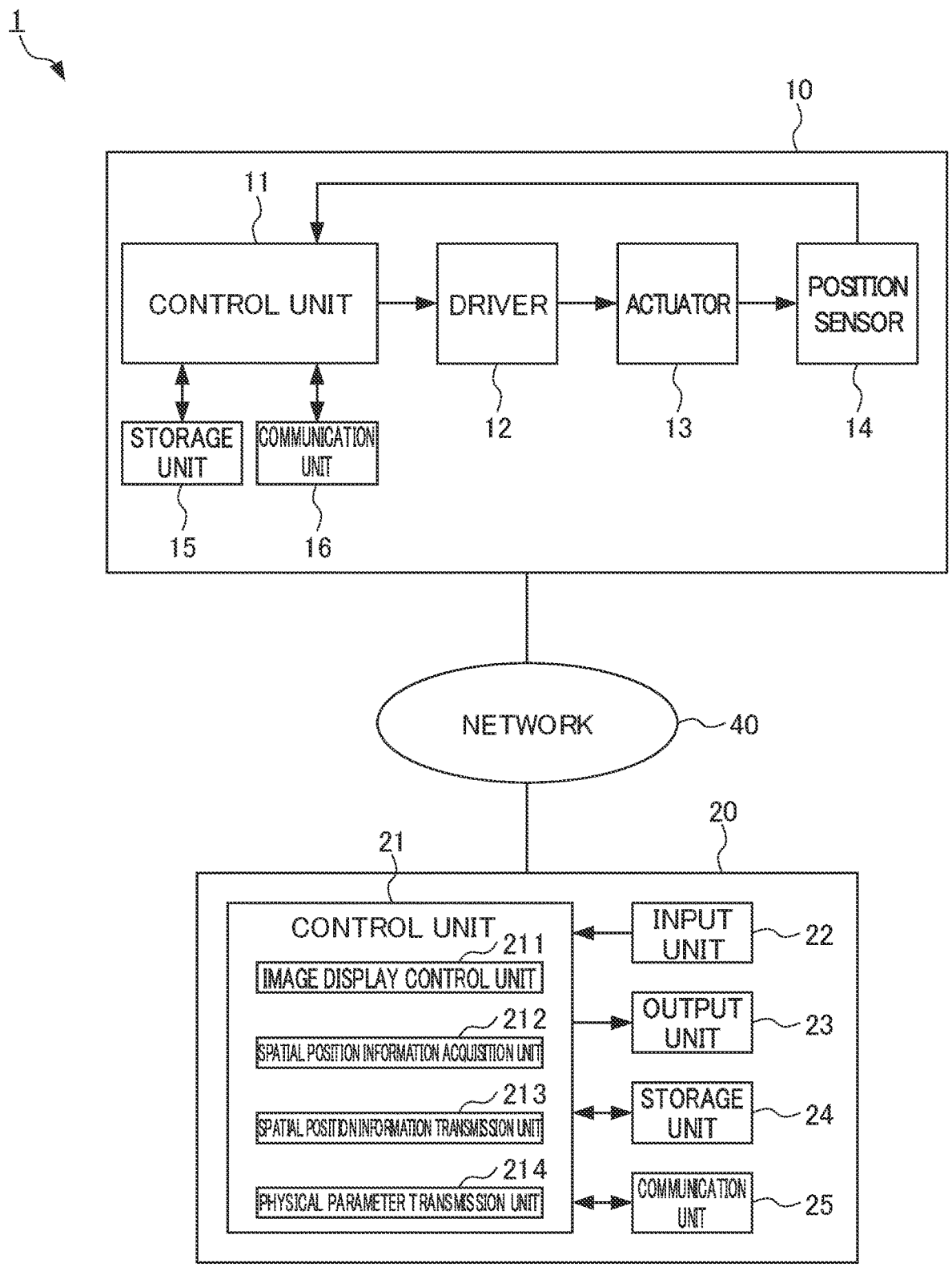
FIG. 5 is a block diagram illustrating a specific configuration example of the worn unit 10 and the control unit 20 in the position/force control system 1.

FIG. 5 is a block diagram illustrating a specific configuration example of the worn unit 10 and the control unit 20 in the position/force control system 1.

In FIG. 5, the worn unit 10 of the position/force control system 1 is configured so as to include a control unit 11, a driver 12, an actuator 13, a position sensor 14, a storage unit 15, and a communicator unit 16. Also, the control unit 20 is configured so as to include a control unit 21, an input unit 22, an output unit 23, a storage unit 24, and a communication unit 25. Note that the position/force control system 1 includes the display unit 30 and the plurality of imaging devices C as described above, although omitted from illustration in FIG. 5.

In the worn unit 10, the control unit 11 includes a processor and semiconductor memory (ROM (Read Only Memory) and RAM (Random Access Memory), etc.), and executes various types of processing in accordance with programs stored in the storage unit 15.

For example, the control unit 11 carries out coordinate conversion of a parameter (such as the output position information of the actuator 13) in the real space into that in the coordinate system in which the position and the force can be independently used and performs a computation for causing the state value (the vector element) that is acquired by the coordinate conversion to follow the target value for fulfilling the function of controlling the force tactile sensation in the coordinate system. The control unit 11 carries out reverse conversion of the result of the computation in the coordinate system described above into a parameter in the real space and controls the actuator 13, based on the parameter. Consequently, the force tactile sensation including the texture that represents the sense of touch of the object surface can be provided.

Figure 6:
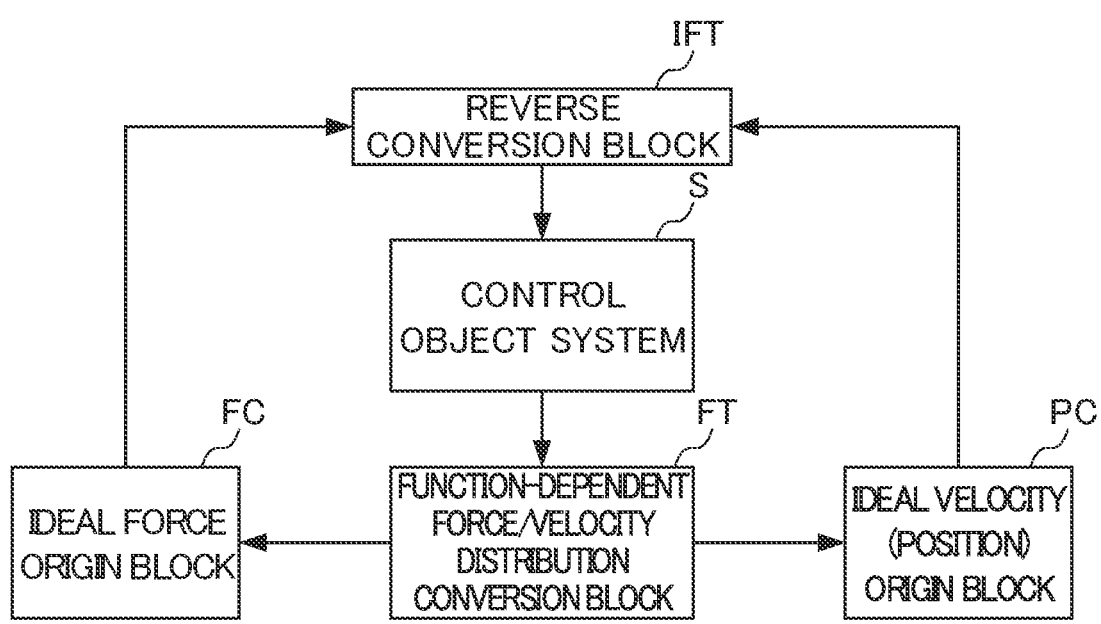
FIG. 6 is a block diagram illustrating a control algorithm that is implemented in the control unit 11.

FIG. 6 is a block diagram illustrating a control algorithm that is implemented in the control unit 11.

As illustrated in FIG. 6, the algorithm that is implemented in the control unit 11 is represented as a control rule that includes the function-dependent force/velocity distribution conversion block FT, and at least an ideal force origin block FC or an ideal velocity (position) origin block PC, and a reverse conversion block IFT. According to the present embodiment, a control object system S includes the driver 12 and the actuator 13.

The function-dependent force/velocity distribution conversion block FT is a block that defines a conversion of control energy in the velocity (position) and force domains, which is specified in accordance with a function of the control object system S. Specifically, the function-dependent force/velocity distribution conversion block FT defines a coordinate conversion whose inputs are a value serving as a reference for the function of the control object system S (a reference value) and the current position of an (output actuator 13 position information). The coordinate conversion is, generally speaking, a conversion of an input vector whose elements are a reference value of velocity (position) and a current velocity (position) to an output vector constituted with a velocity (position) for calculating a control target value of velocity (position), and a conversion of an input vector whose elements are a reference value of force and a current force to an output vector constituted with a force for calculating a control target value of force.

By the coordinate conversion by the function-dependent force/velocity distribution conversion block FT being specified in accordance with the function to be realized, various movements may be realized and movements may be reproduced with scaling.

That is, according to the present embodiment, the function-dependent force/velocity distribution conversion block FT "converts" a variable or an actuator 13 unit (a variable in real space) to a set of variables (variables in space after coordinate conversion) for the whole system representing the function to be realized, and distributes control energy to velocity (position) control energy and force control energy. Therefore, in contrast to a case where control is performed using unmodified variables of actuator the units (variables in real space), velocity (position) control energy and force control energy may be given separately.

According to the present embodiment, for example, as for the reference value and the inputs of the force and the position calculated from the output position information of the actuator 13, the computation of the state value in the space after the coordinate conversion can be performed in a condition in which a difference in position becomes zero, and the sum of the force becomes zero (the same force is outputted in opposite directions).

The ideal force origin block FC is a block that performs computations in the force domain in accordance with the coordinate conversion defined by the function-dependent force/velocity distribution conversion block FT. The ideal force origin block FC sets a target value relating to force in performing a computation on the basis of the coordinate conversion defined by the function-dependent force/velocity distribution conversion block FT. For example, if the function being realized is the same as the function represented by the reference value, the target value is set to zero, and if scaling is to be applied, information representing the function being reproduced is set to a magnified or reduced value.

The ideal velocity (position) origin block PC sets a target value relating to velocity (position) in performing a computation on the basis of the coordinate conversion defined by the function-dependent force/velocity distribution conversion block FT. The target value is set as a fixed value or a variable value, depending on the function being realized. For example, if the function being realized is the same as the function represented by the reference value, the target value is set to zero, and if scaling is to be applied, information representing the function being reproduced is set to a magnified or reduced value.

The reverse conversion block IFT is a block that converts values in the velocity (position) and force domains to values in an input domain for the control object system S (for example, voltage values, current values or the like).

In accordance with the control algorithm, the detection value of the position in time series that is detected by the position sensor 14 is inputted into the control unit 11. The detection value of the position in time series represents the operation of the actuator 13. For information about force and velocity (position) derived from the inputted detection value (position), the control unit 11 uses the coordinate conversion that is set depending on the function.

The driver 12 supplies electric current to the actuator 13, based on a value that is acquired by reverse conversion carried out by the control unit 11 and that is in a domain of an input into the actuator 13.

The actuator 13 is driven by using the electric current that is supplied from the driver 12 and controls the position of an object to be controlled.

The position sensor 13 detects the position of the output shaft of the actuator 13 (or the object to be controlled) and outputs the detection value (output position information) to the control unit 20.

The storage unit 15 is made up of a storage device such as semiconductor memory or the like. The storage unit 15 stores physical parameters of the object to be touched (impedance and contour information of the object). The storage unit 15 also stores the function for defining the sense of touch of the touching object (expression (1) and expression (2)). Note that instead of the function for defining the sense of touch of the touching object (expression (1) and expression (2)), data in a table format that is calculated based on the function may be stored.

The communication unit 16 performs communication with other devices via a communication cable such as a USB (Universal Serial Bus) cable or the like, or a communication network such as the Internet or the like.

In the control unit 20, the control unit 21 includes a processor and semiconductor memory (ROM and RAM, etc.), and executes various types of processing in accordance with programs stored in the storage unit 24.

An image display control unit 211, a spatial position information acquisition unit 212, a spatial position information transmission unit 213, and a physical parameter transmission unit 214 are formed in the control unit 21 as functional configurations.

The image display control unit 211 generates data of the space (virtual space or remote space, etc.) in which the touching object exists, by performing three-dimensional modelling. For example, the image display control unit 211 generates images of virtual real space obtained by three-dimensional modeling based on the data of the taken images, generates images of virtual real space obtained by three-dimensional modeling based on data of three-dimensional computer graphics, and so forth.

The spatial position information acquisition unit 212 detects the position and the attitude of the worn unit 10 based on the images taken by the plurality of imaging devices C. Also, the spatial position information acquisition unit 212 successively acquires (calculates) the in-space position information of the worn unit 10 in the space (virtual space or remote space, etc.) in which the touching object exists, based on the position and the attitude of the worn unit 10 that are detected.

The spatial position information transmission unit 213 successively transmits the in-space position information of the worn unit 10 that is acquired by the spatial position information acquisition unit 212, to the worn unit 10.

The physical parameter transmission unit 214 transmits the physical parameters of the touching object (impedance and contour information of the object) in the space in which the touching object exists to the worn unit 10. In the present embodiment, in a case where the position of the worn unit 10 represented by in-space position information in the space in which the touching object exists reaches (or immediately prior to reaching) a position (boundary of touching object) of a touching object having different physical parameters, the physical parameter transmission unit 214 transmits physical parameters of the new touching object.

The input unit 22 is made up of a keyboard or a pointing device such as a mouse or the like, and inputs various types of information in accordance with instruction operations performed by the user.

The output unit 23 is made up of a display, a speaker, or the like, and performs display of information and output of audio under control of the control unit 21.

The storage unit 24 is made up of a storage device such as semiconductor memory or a hard disk or the like, and stores various types of data and programs used by the three-dimensional object manufacturing device 1. The storage unit 24 also stores physical parameters of the touching object (impedance and contour information of the object) in the space in which the touching object exists, in correlation with the position in the space in which the touching object exists.

The communication unit 25 performs communication with other devices via a communication cable such as a USB cable or the like, or a communication network such as the Internet or the like.

[Operation]

Next, the operations of the position/force control system 1 will be described.

[Position Information Transmission Processing]

Figure 7:
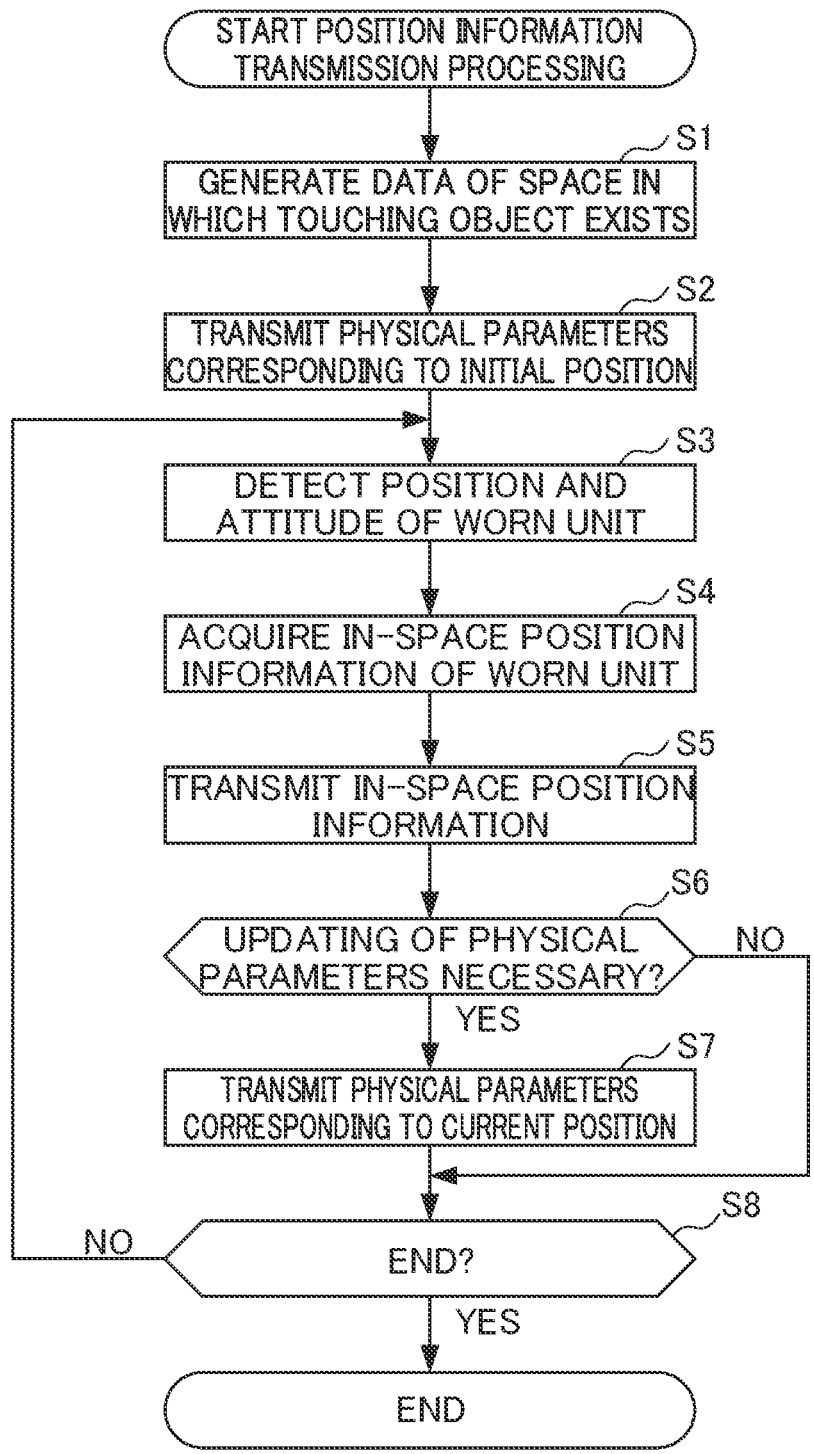
FIG. 7 is a flowchart for describing the flow of position information transmission processing that the control unit 20 executes.

FIG. 7 is a flowchart for describing the flow of position information transmission processing that the control unit 20 executes.

The position information transmission processing is started in response to execution of the position information transmission processing being instructed via the input unit 22 or the communication unit 25.

In step S1, the image display control unit 211 generates data of the space (virtual space or remote space, etc.) in which the touching object exists, by performing three-dimensional modelling.

In step S2, the physical parameter transmission unit 214 transmits the physical parameters of the touching object (impedance and contour information of the object) in the space in which the touching object exists, corresponding to the initial position of the worn unit 10, to the worn unit 10.

In step S3, the spatial position information acquisition unit 212 detects the position and the attitude of the worn unit 10 based on the images taken by the plurality of imaging devices C.

In step S4, the spatial position information acquisition unit 212 acquires (calculates) the in-space position information of the worn unit 10 in the space (virtual space or remote space, etc.) in which the touching object exists, based on the position and the attitude of the worn unit 10 that are detected.

In step S5, the spatial position information transmission unit 213 transmits the in-space position information of the worn unit 10 that is acquired by the spatial position information acquisition unit 212, to the worn unit 10.

In step S6, the physical parameter transmission unit 214 determines whether or not there is a need to update the physical parameters of the touching object in the space in which the touching object exists. Whether or not there is a need to update the physical parameters of the touching object in the space in which the touching object exists can be determined by whether or not the position of the worn unit 10 represented by in-space position information has reached (or whether or not immediately prior to reaching) a position (boundary of touching object) of a touching object having different physical parameters, or the like.

In a case where there is no need to update the physical parameters of the touching object in the space in which the touching object exists, determination of NO is made in step S6, and the processing transitions to step S8.

On the other hand, in a case where there is a need to update the physical parameters of the touching object in the space in which the touching object exists, determination of YES is made in step S6, and the processing transitions to step S7.

In step S7, the physical parameter transmission unit 214 transmits the physical parameters of the touching object (impedance and contour information of the object) corresponding to the current position of the worn unit 10 in the space in which the touching object exists, to the worn unit 10.

In step S8, the spatial position information acquisition unit 212 determines whether or not conditions for ending the position information transmission processing are satisfied. Whether or not conditions for ending the position information transmission processing are satisfied can be determined by, for example, whether or not ending of the position information transmission processing has been instructed via the input unit 22 or the communication unit 25, or whether or not the worn unit 10 is no longer detected from images taken by the plurality of imaging devices C, or the like.

In a case where conditions for ending the position information transmission processing are not satisfied, determination of NO is made in step S8, and the processing transitions to step S3.

On the other hand, in a case where conditions for ending the position information transmission processing are satisfied, determination of YES is made in step S8, and the position formation transmission processing ends.

[Force Tactile Sensation Providing Processing]

Figure 8:
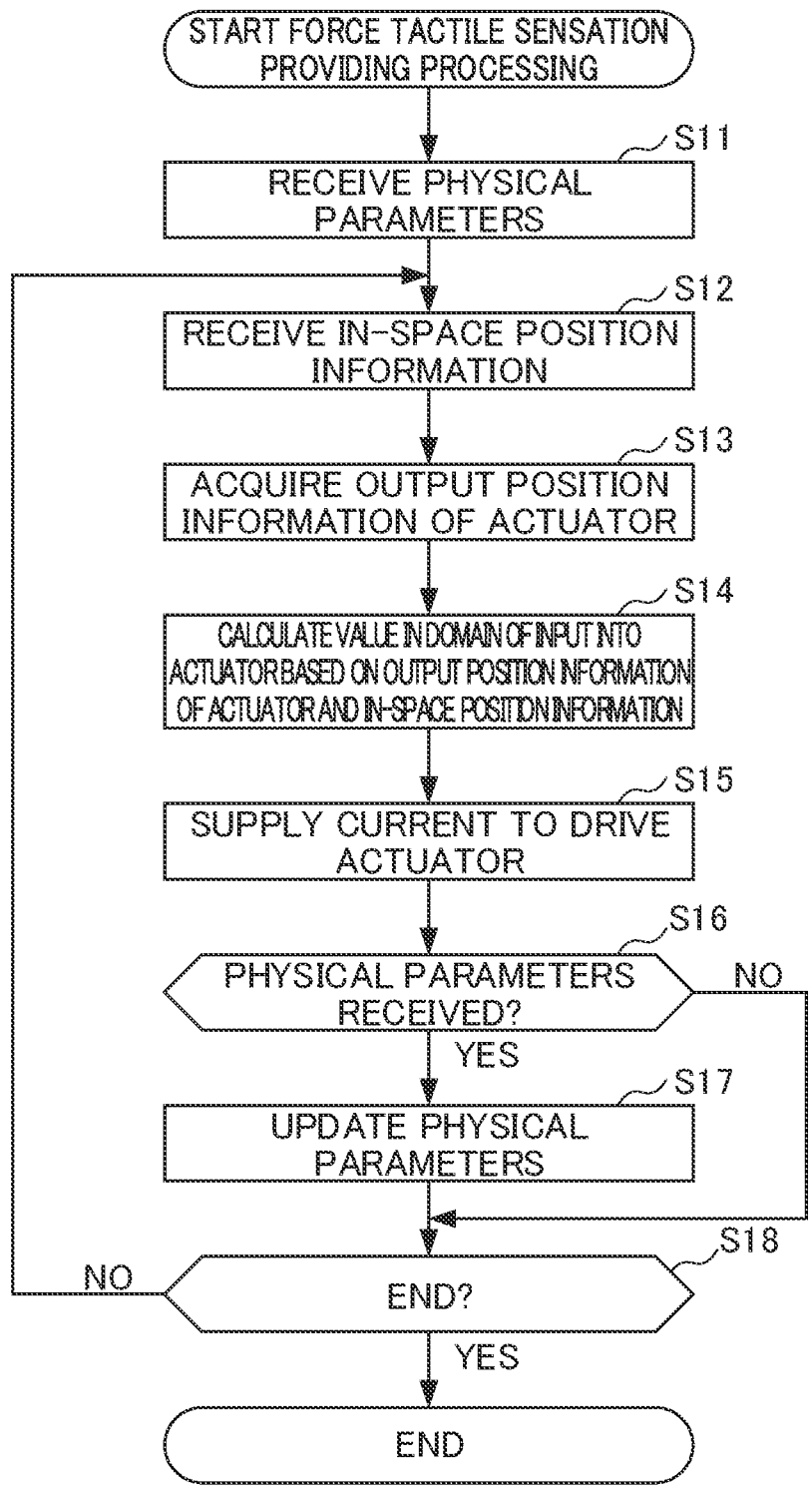
FIG. 8 is a flowchart for describing the flow of force tactile sensation providing processing that the worn unit 10 executes.

FIG. 8 is a flowchart for describing the flow of force tactile sensation providing processing that the worn unit 10 executes.

The force tactile sensation providing processing is started upon the electric power of the worn unit 10 being turned on.

In step S11, the control unit 11 receives physical parameters from the control unit 20 via the communication unit 16. At this time, the control unit 11 stores the physical parameters that are received in the storage unit 15.

In step S12, the control unit 11 receives the in-space position information of the worn unit 10 via the communication unit 16.

In step S13, the control unit 11 acquires output position information of the actuator 13 via the position sensor 14.

In step S14, the control unit 11 calculates the value in a domain of input into the actuator 13 (current value here) for providing the force tactile sensation including texture that represents the sense of touch of the object surface, based on the output position information of the actuator 13 and the in-space position information of the worn unit 10.

At this time, the control unit 11 calculates a reference value corresponding to the touch position of the object to be touched, from the definition expressions of force tactile sensation (see expressions (1) and (2)) in which are set the physical parameters (impedance and contour information of the object) stored in the storage unit 15, in accordance with the in-space position information of the worn unit 10. Also, the control unit 11 performs computation of taking the reference value that is calculated and the output position information of the actuator 13 as input, performing coordinate conversion into a coordinate system in which position and force can be independently handled, and causing state values obtained by coordinate conversion to follow target values for realizing the function of controlling force tactile sensation. The control unit 11 then performs reverse conversion of the computation results in the coordinate system into the value in the domain of input into the actuator 13.

In step S15, the driver 12 supplies current for driving the actuator 13, based on the value in the domain of input into the actuator 13, regarding which reverse conversion was performed by the control unit 11.

In step S16, the control unit 11 determines whether or not physical parameters are received anew from the control unit 20 via the communication unit 16.

In a case where physical parameters are no received anew from the control unit 20 via the communication unit 16, determination of NO is made in step S16, and the processing transitions to step S18.

On the other hand, in a case where physical parameters are received anew from the control unit 20 via the communication unit 16, determination of YES is made in step S16, and the processing transitions to step S17.

In step S17, the control unit 11 updates the physical parameters stored in the storage unit 15 to the newly received physical parameters.

In step S18, the control unit 11 determines whether or not conditions for ending the force tactile sensation providing processing are satisfied. Whether or not conditions for ending the force tactile sensation providing processing are satisfied can be determined by, for example, whether or not an operation has been performed for turning the electric power of the worn unit 10 off, or whether or not an instruction for ending the force tactile sensation providing processing has been input via the communication unit 16, or the like.

In a case where conditions for ending the force tactile sensation providing processing are not satisfied, determination of NO is made in step S18, and the processing transitions to step S12.

On the other hand, in a case where conditions for ending the force tactile sensation providing processing are satisfied, determination of YES is made in step 318, and the force tactile sensation providing processing ends.

As described above, according to the position/force control system 1 of the present embodiment, the control unit 20 acquires (calculates) information relating to the position of the worn unit 10 in the space in which the touching object exists (in-space position information) and successively transmits the in-space position information that is acquired to the worn unit 10, without calculating information representing the force tactile sensation output at the worn unit 10 (position and force output by the actuator 13, etc.). The worn unit 10 stores the physical parameters (impedance and contour information of the object) corresponding to the position in the space in which the touching object exists. The worn unit 10 then calculates information representing the force tactile sensation from the touching object, including texture, using the physical parameters of the object that is the touching object, based on the in-space position information transmitted from the control unit 20 and information relating to the position of the output shaft (or a member that operates in accordance with the outputs shaft) of the actuator 13 (output position information), and controls the actuator 13 to provide the user with force tactile sensation.

Due to employing the configuration described above, the amount of data transmitted from the control unit 20 to the worn unit 10 can be reduced in comparison with a case where the control unit 20 calculates and transmits information relating to the force tactile sensation output at the worn unit 10, and accordingly, delay of control signals can be suppressed from becoming great.

Accordingly control of providing force tactile sensation can be realized by a more appropriate system configuration.

Also, in the position/force control system 1 according to the present embodiment, sense of touch of objects is defined as in expressions (1) and (2), and texture including the sense of touch of the object surface is handled. Accordingly, the parameters to be managed regarding acquisition or providing of sense of touch are the stiffness, the viscosity, and the inertia, which are inherent to the object (impedance), the position on the direction of the plane of the object surface and the position in the direction perpendicular to the plane, and accordingly acquisition or providing of sense of touch can be performed with fewer parameters.

Further, according to the position/force control system 1 of the present embodiment, force tactile sensation can be provided that includes texture representing the sense of touch of the object surface in a case of touching an object in virtual space or remote space or the like (virtual objects in a game using virtual space, products in virtual space being sold through e-commerce, or actual objects existing at remote locations, etc.).

[Modifications of Worn Unit 10]

In the above-described embodiment, an example has been described in which the worn unit 10 is configured as an exoskeletal device including a plurality joints corresponding to human fingers.

In contrast with this, the configuration of the worn unit 10 can take on various forms as described below, as long as the function of being worn by a user and providing the user with force tactile sensation is realized.

Note that in the following examples, description will be made regarding a configuration in which supply of electric power and communication are performed by cable, but a configuration may be made in which electric power is supplied by a battery, and communication is performed wirelessly (wireless type).

[Ring-Form Configuration Example Fit on Fingertip]

Figure 10:
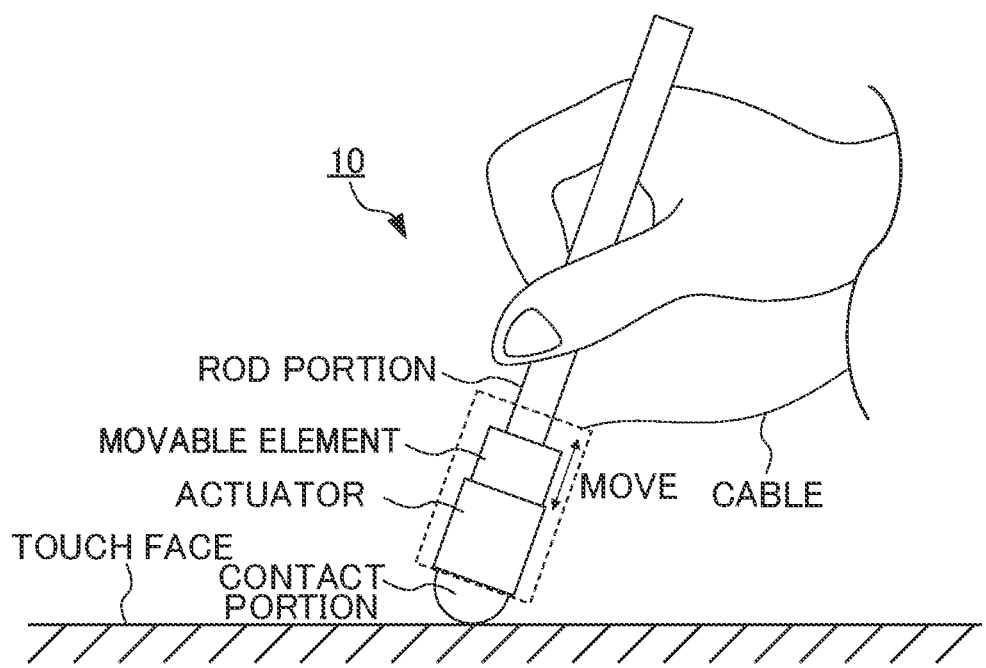
FIG. 10 is a schematic diagram illustrating a configuration example of the worn unit 10 that has a pen form.

FIG. 10 is a schematic diagram illustrating a configuration example of the worn unit 10 that has a ring form and is fit on a fingertip.

Figure 9:
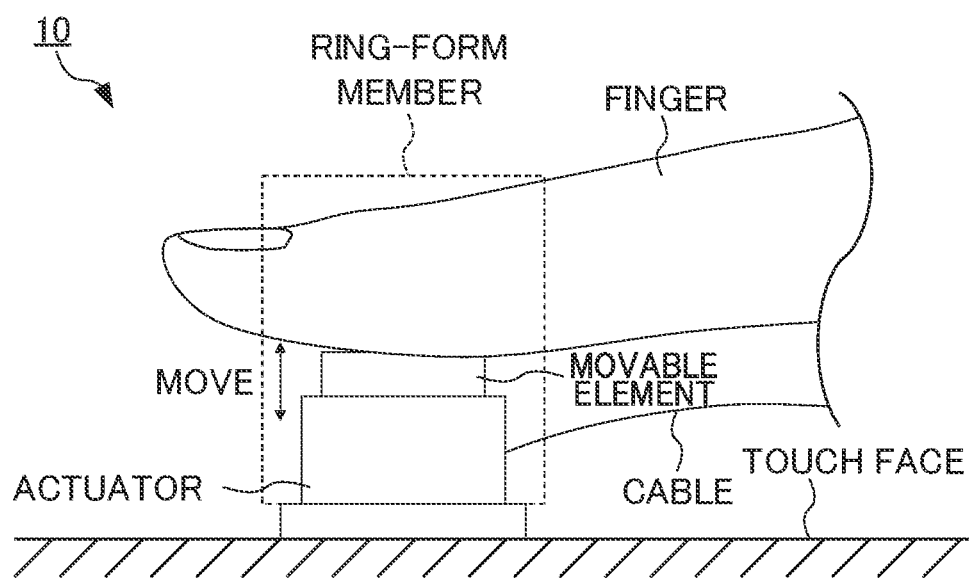
FIG. 9 is a schematic diagram illustrating a configuration example of the worn unit 10 that has a ring form and is fit on a fingertip.

As illustrated in FIG. 9, the worn unit 10, which has a ring form, and is fit on a fingertip has a movable element, which is operated by an actuator, attached on an inner side of a ring-form member (side toward the ball of the finger) and force tactile sensation is provided via this movable element.

Specifically, a user wears the worn unit 10, which has a ring form, on a fingertip, and upon performing actions such as touching or rubbing a touchpad or a touchable screen, the actuator for providing force tactile sensation moves the movable element in a direction protruding from a touch face (so as to advance/retreat), thereby providing sense of touch.

According to such a configuration, the user can sense impedance in the space in which the touching object exists (virtual space or remote space, etc.) via the worn unit 10 that has a ring form.

[Pen-Form Configuration Example]

FIG. 10 is a schematic diagram illustrating a configuration example of the worn unit 10 that has a pen form.

As illustrated in FIG. 10, the worn unit 10 that has a pen form has a contact portion that comes into contact with a touchpad or a touchable screen, and a rod portion that is held by a user. Also, an actuator for providing force tactile sensation is provided to the contact portion, and the rod portion is linked to a movable element that is operated by the actuator. Note that the contact portion is made of a material such that operations can be performed in contact with a touchpad, touch panel, or the like.

Upon the user holding the rod portion and bringing into contact with a touch face, the actuator for providing force tactile sensation moves the movable element in a direction protruding from a touch face (direction causing the rod portion to protrude from the contact portion) (so as to advance/retreat), thereby providing sense of touch.

According to such a configuration, the user can sense impedance in the space in which the touching object exists (virtual space or remote space, etc.) via the worn unit 10 that has a pen form.

[Mouse-Form Configuration Example]

Figure 11:
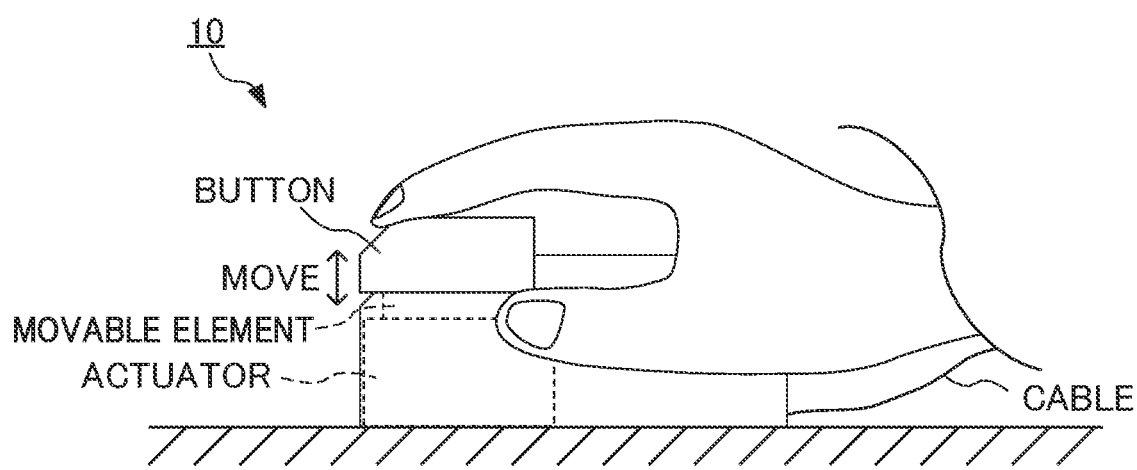
FIG. 11 is a schematic diagram illustrating a configuration example of the worn unit 10 that has a mouse form serving as a pointing device.

FIG. 11 is a schematic diagram illustrating a configuration example of the worn unit 10 that has a mouse form serving as a pointing device.

As illustrated in FIG. 11, the worn unit 10 that has a mouse form has a button on a distal end thereof (a portion where a finger of a user placed), and an actuator for providing force tactile sensation is provided on a lower portion of the button within the worn unit 10. The button is also linked to a movable element that is operated by the actuator. Note that the worn unit 10 that has a mouse form also has functions of a pointing device that moves a mouse cursor, in the same way as with a normal mouse.

Upon the user holding the worn unit 10 having a mouse form in their hand, and performing an operation of moving the mouse cursor, thereby performing actions of touching, rubbing, or the like, with respect to a space in which a touching object provided in a screen exists (virtual space or remote space, etc.), the actuator for providing force tactile sensation moves the movable element in a direction causing the button to protrude from the worn unit 10 (so as to advance/retreat), thereby providing sense of touch.

According to such a configuration, the user can sense impedance in the space in which the touching object exists (virtual space or remote space, etc.) via the worn unit 10 that has a mouse form.

[Game-Controller-Form Configuration Example]

Figure 12:
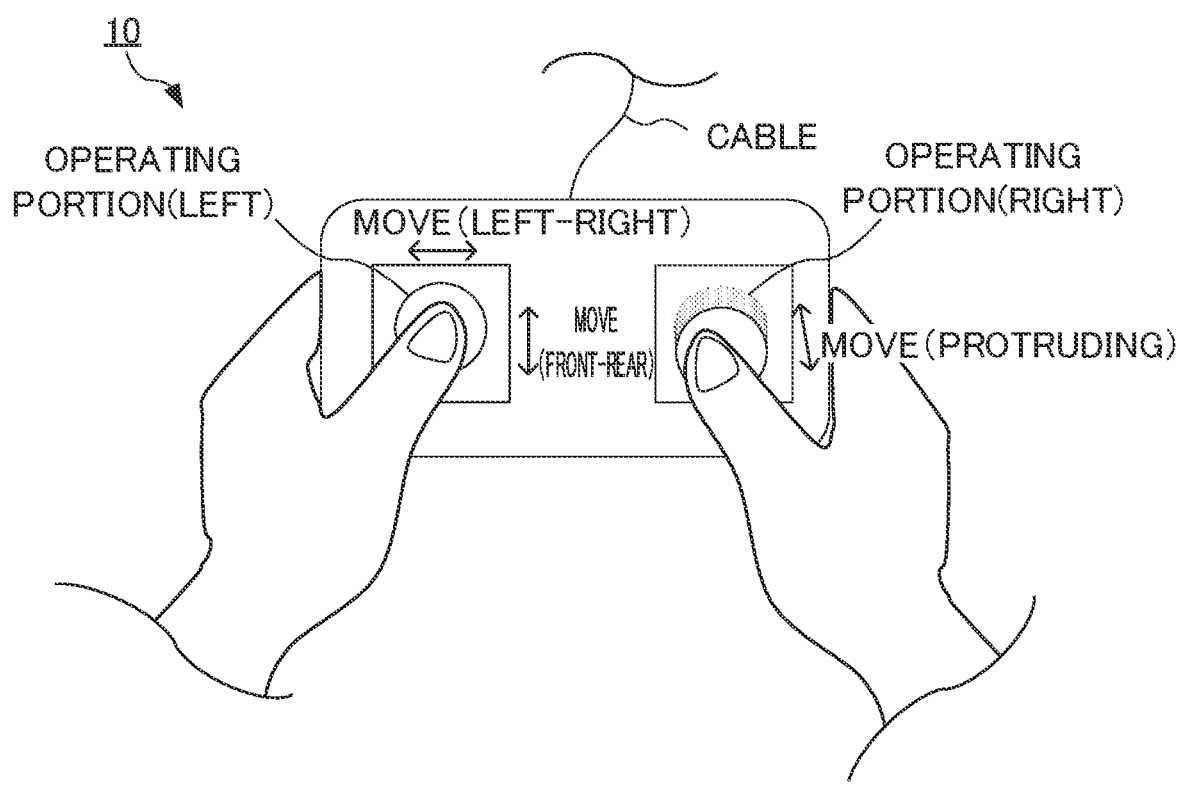
FIG. 12 is a schematic diagram illustrating a configuration example of the worn unit 10 that has a game controller form.

FIG. 12 is a schematic diagram illustrating a configuration example of the worn unit 10 that has a game controller form.

As illustrated in FIG. 12, the worn unit 10 that has a game controller form has two operating portions, left and right, with the operating portion to the left functioning as a key for moving (for moving operations in a plane direction), and the operating portion to the right functioning as a button for click operations and so forth, for example.

These two operating portions have actuators within a controller main unit, for providing force tactile sensation.

For example, the left operating portion is linked to each of a movable element of an actuator that moves (advances/retreats) in a left-right direction and a movable element of an actuator that moves (advances/retreats) in a front-rear direction. Also, the right operating portion is linked to a movable element of an actuator that moves (advances/retreats) in a direction protruding from the controller main unit.

Upon the user holding the worn unit 10 having a game controller form in their hand, and performing actions of touching, running, or the like, with respect to a space in which a touching object in a screen exists (virtual space or remote space, etc.), the actuators for providing force tactile sensation move the movable elements (so as to advance/retreat) such that the left and right buttons respectively move in the front-rear left-right directions and in the direction protruding from the controller main unit, thereby providing sense of touch.

According to such a configuration, the user can sense impedance in the space in which the touching object exists (virtual space or remote space, etc.) via the worn unit 10 that has a game controller form.

As described above, the position/force control system 1 according to the present embodiment includes the worn unit 10 and the control unit 20.

The worn unit 10 is worn on a body of a user, and force tactile sensation is provided by the actuator 13.

Based on data of a space in which a touching object exists, the control unit 20 acquires data of the position of the worn unit 10 in space.

The worn unit 10 includes the control unit 11 that acquires data of the position from the control unit 20, and provides force tactile sensation by controlling driving of the actuator 13 based on impedance and contour information of the touching object in the space, and the data of the position.

Accordingly, the amount of data transmitted from the control unit 20 to the worn unit 10 can be reduced as compared with a case where the control unit 20 calculates and transmits information relating to force tactile sensation to be output at the worn unit 10, and thus delay in control signals can be suppressed from becoming great.

Therefore, control of providing force tactile sensation can be realized by a more appropriate system configuration.

The control unit 11 calculates reference values for position and force based on the impedance and contour information of the touching object in the space and the data of the position, takes the reference values that are calculated, and information relating to position based on actions of the actuator 13, as input to perform conversion to a coordinate system in which position and force are independent, and performs computation causing state values in the coordinate system to follow target values of position and force, and thereafter performs reverse conversion of the conversion on the computation results to calculate parameters for controlling the actuator 13, thereby controlling driving of the actuator 13.

Accordingly, independent target values can be set for the position and the force, and the actuator 13 can be controlled so as to realize these target values.

Impedance and contour information of the touching object in the space is stored in the worn unit 10 in advance.

The control unit 11 references the impedance and contour information of the touching object that is stored, and also successively acquires data of position that is acquired by the control unit 20, to control driving of the actuator 13, thereby providing force tactile sensation.

Accordingly, the worn unit 10 is capable of controlling driving of the actuator 13 and providing force tactile sensation by acquiring data of position from the control unit 20.

In at least either of a case of the position of the worn unit 10 in a space reaching a boundary of a touching object or immediately prior to reaching the boundary, the control unit 11 references the impedance and contour information of the touching object acquired from the control unit 20, and also successively acquires data of position that is acquired by the control unit 20, to control driving of the actuator 13, thereby providing force tactile sensation.

Accordingly, the worn unit 10 can control driving of the actuator 13 and provide force tactile sensation, by acquiring the data of the position while acquiring necessary physical parameters (impedance and contour information of the touching object) from the control unit 20 as appropriate.

The control unit 20 acquires data of position that serves as the reference for the worn unit 10 in the space.

The worn unit 10 acquires data of position that serves as the reference for the worn unit 10 from the control unit 20, calculates a relative position that represents a part of the worn unit 10 in the space based on the data of this position that serves as the reference, and controls driving of the actuator 13.

Accordingly, it is sufficient for data of position that serves as the reference for the worn unit 10 to be transmitted from the control unit 20 to the worn unit 10, and thus the amount of data transmitted from the control unit 20 to the worn unit 10 can be reduced.

The control unit 20 acquires data of position that represents a part of the worn unit 10 in a space.

The worn unit 10 acquires the data of position that represents a part of the worn unit 10 from the control unit 20, and controls driving of the actuator 13.

Accordingly, the control unit 20 can acquire the data of the position of a part of the worn unit 10 (the part touching the touching object, etc.), and thus the amount of computation at the worn unit 10 can be reduced.

The present invention is not to be limited to the above-described embodiment. Various changes, modifications, etc. are also covered by the present invention as long as such changes, modifications, etc. fall in a range in which the object of the present invention can be achieved.

For example, description is made in the above embodiment regarding an example in which the control unit 20 detects the position and the attitude of the worn unit 10 based on images and so forth taken by the plurality of imaging devices C and calculates the in space position information, this is not restrictive. For example, in-space position information may be calculated by inputting the position and the attitude of the worn unit 10 in the space in which the touching object exists using an input device such as a mouse or the like.

In an example described above, the reference value (or the target value after coordinate conversion) that is determined based on the function that defines the sense of touch of the object is set to the value depending on scaling in the case where the sense of touch of the object surface is emphasized or reduced, but this is not a limitation. That is, another method can be used provided that the sense of touch that is provided to the user is emphasized or reduced. For example, the texture can be magnified or reduced and provided to the user, for example, by applying a gain to the input into the actuator.

The process in the embodiment and the like may be performed through hardware or software.

That is, any configuration may be employed as long as a function for performing the process described above is provided for the position/force control system 1. The functional configuration and the hardware configuration for realizing the function are not limited to the examples described above.

When the process described above is performed through software, programs constituting the software are installed from a network or a storage medium to a computer.

The storage medium that stores the program is constituted by, for example, a removable medium that is distributed separately from the device body or a storage medium that is previously built in the device body. The removable medium is constituted by, for example, a semiconductor memory, a magnetic disk, an optical disc, or a magneto-optical disk. The optical disc is constituted by, for example, a CD-RPM (Compact Disk-Read Only Memory), a DVD (Digital Versatile Disk), or a Blu-ray Disc (trademark). The magneto-optical disk is constituted by, for example, a MD (Mini- Disk). The storage medium that is previously built in the device body is constituted by, for example, ROM, a hard disk or a semiconductor memory in which the program is stored.

The above embodiment is an example to which the present invention is applied, and does not limit the technical scope of the present invention. That is, the present invention may be subjected to various modifications such as omission and replacement without deviating from the spirit of thereof, and various embodiments other than that described above may be implemented. Various embodiments and modifications thereof that can be implemented in the present invention are included in the scope of the invention described in the claims and an equivalent scope.

REFERENCE SIGNS LIST 1 position/force control system, 10 worn unit, 11, 21 control unit, 211 image display control unit, spatial position information acquisition unit, 213 spatial position information transmission unit, 214 physical parameter transmission unit, 12 driver, 13 actuator, 14 position sensor, 15, 24 storage unit, 16, 25 communication unit, 20 control unit, 22 input unit, 23 output unit, 30 display unit, 40 network, FT function-dependent force/velocity distribution conversion block, FC ideal force origin block, PC ideal velocity (position) origin block, IFT reverse conversion block, S control object system

The invention claimed is:

1. A position/force control system, comprising:
a worn unit that is configured to be worn on a body of a user and to provide force tactile sensation by an actuator; and
a control unit that, based on data of a space in which a touching object exists, acquires data of a position in the space corresponding to the worn unit,
wherein the worn unit includes a controller that acquires the data of the position from the control unit, and controls driving of the actuator based on impedance, which is determined by rigidity, viscosity and inertia, and contour information of the touching object in the space, and the data of the position, thereby providing the force tactile sensation,
wherein the touching object is a virtual or remote touching object with which the user is not in direct touch.

2. The position/force control system according to claim 1, wherein the controller calculates a reference value for position and force based on the impedance and contour information of the touching object in the space and the data of the position and the reference value that is calculated, takes information relating to position based on an action of the actuator as input to perform conversion to a coordinate system in which position and force are independent, and performs computation causing a state value in the coordinate system to follow target values of position and force, and thereafter performs reverse conversion of the conversion on the computation results to calculate parameters for controlling the actuator, thereby controlling driving of the actuator.

3. The position/force control system according to claim 1, wherein:
the impedance and contour information of the touching object in the space is stored in the worn unit in advance, and
the controller references the impedance and contour information of the touching object that is stored, and also successively acquires the data of the position that is acquired by the control unit, to control driving of the actuator, thereby providing the force tactile sensation.

4. The position/force control system according to claim 1, wherein, in at least either one of a case of the position in the space corresponding to the worn unit reaching a boundary of the touching object, or immediately prior to reaching the boundary, the controller references the impedance and contour information of the touching object acquired from the control unit, and also successively acquires the data of the position that is acquired by the control unit, to control driving of the actuator, thereby providing the force tactile sensation.

5. The position/force control system according to claim 1, wherein:
the control unit acquires the data of the position that serves as the reference for the worn unit in the space, and
the worn unit acquires the data of the position that serves as the reference for the worn unit from the control unit, calculates a relative position that represents a part of the worn unit in the space based on this data of the position that serves as the reference, and controls driving of the actuator.

6. The position/force control system according to claim 1, wherein:
the control unit acquires the data of the position that represents a part of the worn unit in the space, and
the worn unit acquires the data of the position that represents a part of the worn unit from the control unit, and controls driving of the actuator.

7. A worn unit in a position/force control system that includes the worn unit that is configured to be worn on a body of a user and to provide force tactile sensation by an actuator, and a control unit that, based on data of a space in which a touching object exists, acquires data of a position in the space corresponding to the worn unit, wherein the worn unit includes a controller that acquires the data of the position from the control unit, and controls driving of the actuator based on impedance, which is determined by rigidity, viscosity and inertia, and contour information of the touching object in the space, and the data of the position, thereby providing the force tactile sensation,
wherein the touching object is a virtual or remote touching object with which the user is not in direct touch.

8. A control unit in a position/force control system that includes a worn unit that is configured to be worn on a body of a user and to provide force tactile sensation by an actuator, and the control unit that, based on data of a space in which a touching object exists, acquires data of a position in the space corresponding to the worn unit,
wherein the control unit acquires the data of the position in the space corresponding to the worn unit, and successively transmits the data of the position to the worn unit, to control driving of the actuator based on the impedance, which is determined by rigidity, viscosity, and inertia, and contour information of the touching object in the space and the data of the position, thereby providing the force tactile sensation,
wherein the touching object is a virtual or remote touching object with which the user is not in direct touch.

9. A position/force control method executed by a position/force control system that includes a worn unit that is configured to be worn on a body of a user and to provide force tactile sensation by an actuator, and a control unit that, based on data of a space in which a touching object exists, acquires data of a position in the space corresponding to the worn unit, the method comprising:

acquiring, by the worn unit, the data of the position from the control unit; and controlling driving of the actuator based on impedance, which is determined by rigidity, viscosity, and inertia, and contour information of the touching object in the space, and the data of the position, thereby providing the force tactile sensation, wherein the touching object is a virtual or remote touching object with which the user is not in direct touch.

10. A non-transitory storage medium encoded with a computer-readable program that controls a processor of a computer controlling a position/force control system that includes a worn unit that is configured to be worn on a body of a user and to provide force tactile sensation by an actuator, and a control unit that, based on data of a space in which a touching object exists, acquires data of a position in the space corresponding to the worn unit, to execute a control processing including providing force tactile sensation, by the worn unit acquiring the data of the position from the control unit, and controlling driving of the actuator based on impedance, which is determined by rigidity, viscosity, and inertia, and contour information of the touching object in the space, and the data of the position, wherein the touching object is a virtual or remote touching object with which the user is not in direct touch.

* * * * *